United States Patent
Sakawaki et al.

(10) Patent No.: US 6,686,072 B2
(45) Date of Patent: Feb. 3, 2004

(54) MAGNETIC RECORDING MEDIUM, PROCESS AND APPARATUS FOR PRODUCING THE SAME, AND MAGNETIC RECORDING AND REPRODUCING APPARATUS

(75) Inventors: Akira Sakawaki, Chiba (JP); Masato Kokubu, Chiba (JP); Hiroshi Sakai, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 43 days.

(21) Appl. No.: 09/940,853

(22) Filed: Aug. 29, 2001

(65) Prior Publication Data

US 2002/0048695 A1 Apr. 25, 2002

(30) Foreign Application Priority Data

Aug. 29, 2000 (JP) ..................... P2000-259871
Nov. 1, 2000 (JP) ..................... P2000-335021

(51) Int. Cl.$^7$ .............................. G11B 5/66; G11B 5/70
(52) U.S. Cl. ................. 428/694 TS; 428/611; 428/900; 204/192.2; 427/128; 427/131
(58) Field of Search ............... 428/694 TS, 900, 428/611; 204/192.2, 192.15; 427/128, 131

(56) References Cited

U.S. PATENT DOCUMENTS 5,480,733 A   1/1996   Okumura et al. ......... 428/694 T
5,989,674 A * 11/1999  Marinero et al. .......... 428/65.3
6,001,447 A * 12/1999  Tanahashi et al. ......... 428/65.3
2002/0160234 A1 * 10/2002 Sakawaki et al. ....... 428/694 TS

FOREIGN PATENT DOCUMENTS

JP     05-143988 A    6/1993
JP     06-267050 A    9/1994

OTHER PUBLICATIONS

Patent Abstracts of Japan abstracting JP 05–143988 of Jun. 11, 1993.
Patent Abstracts of Japan abstracting JP 06–267050 of Sep. 22, 1994.

* cited by examiner

Primary Examiner—Holly Rickman
(74) Attorney, Agent, or Firm—Sughrue Mion, PLLC

(57) ABSTRACT

A magnetic recording medium which exhibits excellent magnetic characteristics and which can be easily produced is disclosed. A magnetic recording medium containing a non-metallic substrate 1, a non-magnetic undercoat film 3, a cobalt alloy hexagonal closed packed (hcp) (110) textured magnetic film 4, and a protective film 5 formed on the substrate. An orientation-determining film 2, which determines the crystal orientation of an undercoat film provided directly thereon to cause the texture of the undercoat film to be (200), is formed between the substrate 1 and the undercoat film 3. The orientation-determining film 2 has a crystal structure such that columnar fine crystal grains 2a are inclined in a radial direction of the substrate 1, and the ratio of a coercive force in a circumferential direction of the medium (Hcc) to a coercive force in a radial direction of the medium (Hcr); i.e., Hcc/Hcr, is more than 1.

21 Claims, 6 Drawing Sheets

MAGNETIC RECORDING MEDIUM, PROCESS AND APPARATUS FOR PRODUCING THE SAME, AND MAGNETIC RECORDING AND REPRODUCING APPARATUS

FIELD OF THE INVENTION

The present invention relates to a magnetic recording medium used in an apparatus such as a magnetic disk apparatus; a process and an apparatus for producing the magnetic recording medium; and a magnetic recording and reproducing apparatus incorporating the magnetic recording medium.

BACKGROUND OF THE INVENTION

Conventionally, a metallic substrate formed from, for example, an aluminum alloy is widely used as a substrate for producing a magnetic recording medium. Usually, such a metallic substrate undergoes texturing, and is used for producing a magnetic recording medium.

Texturing is a process for forming irregularities on a substrate along a predetermined direction (usually in a circumferential direction) of the substrate. When the surface of a substrate undergoes texturing, the crystal orientation of an undercoat film and a magnetic film, which are formed on the substrate, is enhanced, and the magnetic film exhibits magnetic anisotropy, and thus magnetic characteristics, such as thermal stability and resolution, of a magnetic recording medium can be enhanced.

In recent years, instead of a metallic substrate formed from aluminum or similar metal, a non-metallic substrate formed from material such as glass or ceramic has been widely used as a substrate for producing a magnetic recording medium. Such a non-metallic substrate has an advantage that head slap does not easily occur in the substrate, because of the high hardness of the substrate. Furthermore, from the viewpoint of glide height characteristics, such a non-metallic substrate is advantageously used, because of its excellent surface smoothness.

However, a non-metallic substrate such as a glass substrate encounters difficulty in undergoing satisfactory texturing.

In order to solve such problems, there has been proposed formation of a hard film which can be easily textured on a non-metallic substrate formed from material such as glass or ceramic.

For example, Japanese Patent Application Laid-Open (kokai) No. 5-197941 discloses a magnetic recording medium including a non-metallic substrate coated through sputtering with NiP film serving as a hard film which is easily textured.

A magnetic recording medium including a hard film formed on a non-metallic substrate is produced through the following process: the hard film is formed on the substrate in a film formation apparatus such as a sputtering apparatus; the substrate is temporarily removed from the apparatus and subjected to texturing by use of a texturing apparatus; the resultant substrate is again placed in the apparatus; and then an undercoat film and a magnetic film are formed on the substrate.

However, imparting satisfactory surface smoothness to the hard film of the aforementioned conventional magnetic recording medium is difficult. Consequently, the medium exhibits poor magnetic anisotropy and unsatisfactory magnetic characteristics. In addition, the production process for the magnetic recording medium includes complicated production steps, resulting in high production costs. Therefore, there has been keen demand for a magnetic recording medium which can be easily produced.

Japanese Patent Application Laid-Open (kokai) No. 5-143988 discloses a production process for a magnetic recording medium in which magnetic anisotropy is imparted to a magnetic film. The production process disclosed in this publication includes forming an undercoat layer and a magnetic recording layer through sputtering, such that particles of a sputtering target are deposited onto the layers at an incident angle of 30–65°.

However, in a magnetic recording medium produced through the aforementioned process, the predominant orientation plane of a non-magnetic undercoat film is a (110) plane, and the predominant orientation plane of a magnetic film is a (101) plane. Therefore, the magnetic recording medium tends to exhibits poor magnetic anisotropy, resulting in unsatisfactory magnetic characteristics.

SUMMARY OF THE INVENTION

In view of the foregoing, an object of the present invention is to provide a magnetic recording medium which exhibits excellent magnetic characteristics and can be easily produced; a process and an apparatus for easily producing the magnetic recording medium; and a magnetic recording and reproducing apparatus incorporating the magnetic recording medium exhibiting excellent magnetic characteristics.

The present invention provides a magnetic recording medium comprising a non-metallic substrate; a non-magnetic undercoat film; and an orientation-determining film formed between the substrate and the undercoat film, which film determines the crystal orientation of a film provided directly thereon, characterized in that the orientation-determining film has a crystal structure in which columnar fine crystal grains are inclined in a radial direction, and the ratio of a coercive force in a circumferential direction of the medium (Hcc) to a coercive force in a radial direction of the medium (Hcr); i.e., Hcc/Hcr, is more than 1.

A magnetic film has an hcp structure and the orientation plane of the magnetic film is a (110) plane; and the non-magnetic undercoat film has a bcc structure and the orientation plane of the undercoat film is a (200) plane.

The orientation-determining film causes the texture of the following bcc undercoat film to be (200) (hereinafter "orientation-determining film").

The orientation-determining film may comprise one or more elements selected from among Cr, V, Nb, Mo, W, and Ta.

The orientation-determining film which causes the texture of the following bcc undercoat film to be (200) may comprise an alloy predominantly containing Cr.

The orientation-determining film which causes the texture of the following bcc undercoat film to be (200) may predominantly comprise CoTa (Ta content: 30–75 at %) or CoNb (Nb content: 30–75 at %), and may have an Fd3m structure or an amorphous structure.

The orientation-determining film which causes the texture of the following bcc undercoat film to be (200) may predominantly comprise CrTa (Ta content: 15–75 at %) or CrNb (Nb content: 15–75 at %).

The orientation-determining film which causes the texture of the following bcc undercoat film to be (200) may predominantly comprise NiTa (Ta content: 30–75 at %) or NiNb (Nb content: 30–75 at %), and may have an Fd3m structure or an amorphous structure.

The orientation-determining film which causes the texture of the following bcc undercoat film to be (200) may comprise a non-magnetic metal having an Fd3m structure.

The orientation-determining film which causes the texture of the following bcc undercoat film to be (200) may comprise a non-magnetic metal having a C15 structure.

An orientation-enhancing film may be formed between the non-metallic substrate and the orientation-determining film which causes the texture of the following bcc undercoat film to be (200).

Preferably, the orientation-enhancing film comprises a material having a B2 structure or an amorphous structure.

The orientation-enhancing film may predominantly comprise any alloy selected from among NiAl, FeAl, CoAl, CoZr, CoCrZr, and CoCrC.

The orientation-determining film which causes the texture of the following bcc undercoat film to be (200) may comprise an amorphous NiP alloy, and the ratio of a coercive force in a circumferential direction of the medium (Hcc) to a coercive force in a radial direction of the medium (Hcr); i.e., Hcc/Hcr, is more than 1.

In this specification, "predominantly" means "in excess of 50 at %".

The present invention also provides a process for producing the aforementioned magnetic recording medium, which process comprises forming the orientation-determining film by releasing from a release source film formation particles containing a material constituting the film, and then depositing the particles onto a deposition surface, characterized in that the direction of the trajectory of the film formation particles is determined such that a projection line of the trajectory of the particles formed on the deposition surface lies along a radial direction of the non-metallic substrate, and the incident angle of the trajectory of the particles is 10–75° with respect to the non-metallic substrate.

The orientation-determining film may be subjected to oxidation or nitridation.

The orientation-determining film may be formed through sputtering by use of a sputtering target serving as a release source of film formation particles.

When the orientation-determining film is formed, the film may be subjected to oxidation or nitridation by use of a sputtering gas containing oxygen or nitrogen.

The oxidation or nitridation may be carried out by bringing the orientation-determining film into contact with an oxygen-containing gas or a nitrogen-containing gas.

The present invention also provides an apparatus for producing the aforementioned magnetic recording medium, which apparatus comprises a release source for releasing film formation particles containing a material constituting the orientation-determining film, the film being formed through deposition of the particles onto a deposition surface; and means for determining the direction of the trajectory of the film formation particles released from the release source, characterized in that the direction-determining means can determine the direction of the trajectory of the particles such that a projection line of the trajectory of the particles formed on the deposition surface lies along a radial direction of the non-metallic substrate, and that the incident angle of the trajectory of the particles is 10–75° with respect to the non-metallic substrate.

The present invention also provides a magnetic recording and reproducing apparatus comprising the aforementioned magnetic recording medium, and a magnetic head for recording data onto the medium and reproducing the data therefrom.

DESCRIPTION OF REFERENCE NUMERALS

Figure 1A:
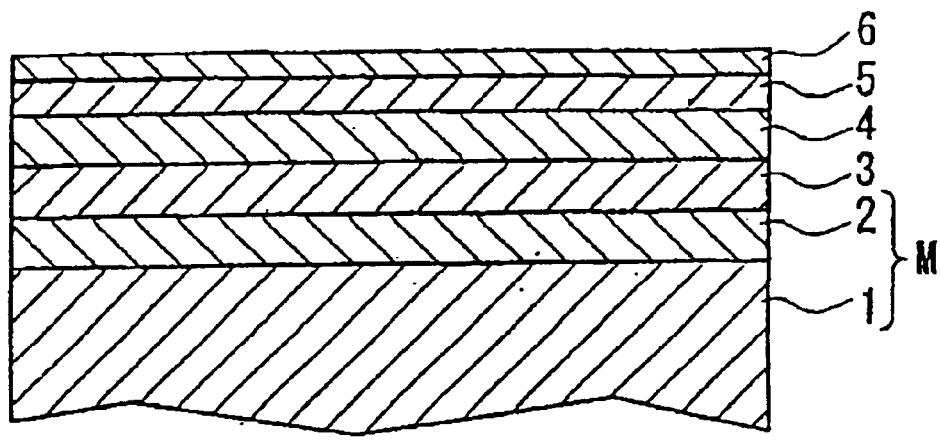
FIG. 1(a) is a partial cross-sectional view showing an embodiment of the magnetic recording medium of the present invention.

1. Non-metallic substrate
1a. Non-metallic substrate surface (deposition surface)
2. Orientation-determining film
2a. Columnar fine crystal grains
3. Non-magnetic undercoat film
4. Magnetic film
7. Magnetic recording medium
9. Magnetic head
22. Sputtering target
23. Shielding plate (direction-determining means)
26. Trajectory of film formation particles
27. Projection line
α, α'. Incident angle
α1. Inclination angle of columnar fine crystal grains

DESCRIPTION OF THE INVENTION

FIG. 1(a) is a partial cross-sectional view showing a first embodiment of the magnetic recording medium of the present invention. The magnetic recording medium includes a non-metallic substrate 1, an orientation-determining film 2 formed on the substrate 1, a non-magnetic undercoat film 3, a magnetic film 4, a protective film 5, and a lubrication film 6, the films 3 to 6 being successively formed on the film 2. Hereinafter, the structure consisting of the non-metallic substrate 1 and the orientation-determining film 2 will be called a medium substrate M.

Figure 1B:
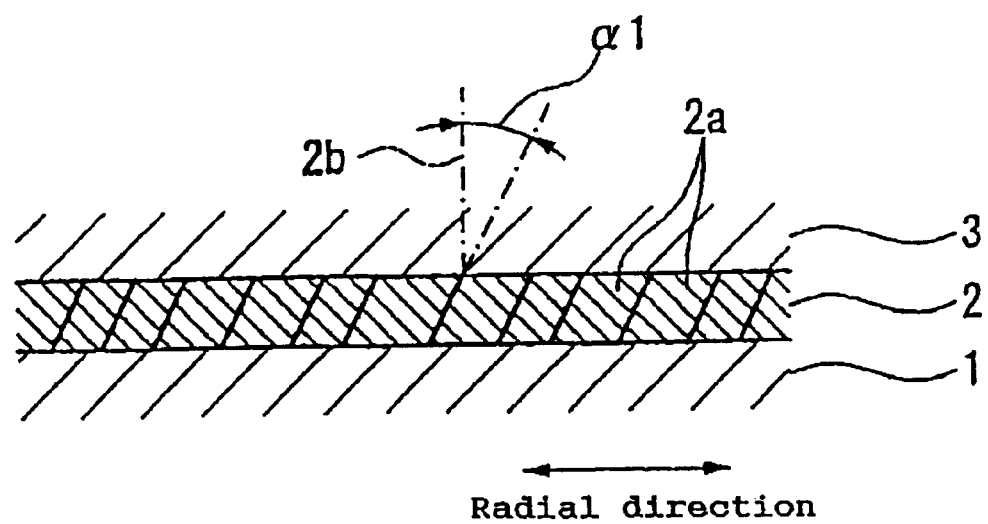
FIG. 1(b) is an enlarged view showing an essential portion of the magnetic recording medium shown in FIG. 1(a), which is prepared from the transmission electron microscope (TEM) photograph of the cross section of the medium.

FIG. 1(b) is an enlarged view showing an essential portion of the magnetic recording medium shown in FIG. 1(a), derived from a transmission electron microscope (TEM) photograph of a cross section of the medium.

The non-metallic substrate 1 is formed from a non-metallic material such as glass, ceramic, silicon, silicon carbide, or carbon. Particularly, from the viewpoints of durability and cost, a glass substrate is preferably used.

The glass substrate may be formed from amorphous glass or glass ceramic. The amorphous glass may be commonly used soda-lime glass, aluminocate glass, or aluminosilicate glass. The glass ceramic may be lithium-based glass ceramic.

Meanwhile, a ceramic substrate may be a commonly used sintered compact predominantly containing aluminum oxide, aluminum nitride, and silicon nitride; or fiber-reinforced material thereof.

The orientation-determining film 2 is provided for determining the crystal orientation of the non-magnetic undercoat film 3 formed directly on the film 2 and for determining the crystal orientation of the magnetic film 4 formed on the film 3, to thereby enhance the magnetic anisotropy of the magnetic film 4.

Preferably the orientation-determining film subjected to the oxidation or nitrodation during the film formation comprises nitrogen or oxygen where the nitrogen or oxygen content is 1 at % or more. The regulation of a crystal structure of the orientation-determining film can be enhanced and the orientation plane (200) of the non-magnetic undercoat film can be enhanced. Then the magnetic anisotropy of the magnetic film 4 can be enhanced, which is preferred.

The orientation-determining film 2 which causes the texture of the following bcc undercoat film to be (200) may be formed from one or more elements selected from among Cr, V, Nb, Mo, W, and Ta.

The orientation-determining film 2 which causes the texture of the following bcc undercoat film to be (200) may be formed from an alloy predominantly containing Cr (i.e., the Cr content of the alloy is in excess of 50 at %). Particularly, the film 2 which causes the texture of the following bcc undercoat film to be (200) is preferably formed from a CrX alloy (wherein X is one or more elements selected from among B, C, N, O, Si, Ti, V, Nb, Mo, Ta, and W).

When the orientation-determining film 2 which causes the texture of the following bcc undercoat film to be (200) is formed from such a CrX alloy, the X content of the alloy is preferably at least 1 at % and less than 50 at %. This is because, when the X content falls within the above range, the crystal orientation of the non-magnetic undercoat film 3 and the magnetic film 4 can be enhanced, to thereby enhance the magnetic anisotropy of the magnetic film 4.

The orientation-determining film 2 which causes the texture of the following bcc undercoat film to be (200) may be formed from CrRu (Ru content: 1–30 at %).

Preferably, the orientation-determining film 2 which causes the texture of the following bcc undercoat film to be (200) predominantly contains CoTa (Ta content: 30–75 at %) or CoNb (Nb content: 30–75 at %), and has an Fd3m structure (space group notation) or an amorphous structure.

The orientation-determining film 2 which causes the texture of the following bcc undercoat film to be (200) may predominantly contain CrTa (Ta content: 15–75 at %) or CrNb (Nb content: 15–75 at %).

The orientation-determining film 2 which causes the texture of the following bcc undercoat film to be (200) may predominantly contain NiTa (Ta content: 30–75 at %) or NiNb (Nb content: 30–75 at %), and may have an Fd3m structure or an amorphous structure.

When the orientation-determining film 2 which causes the texture of the following bcc undercoat film to be (200) predominantly contains CoTa, CoNb, CrTa, CrNb, NiTa, or NiNb, the Ta content or Nb content of the alloy preferably falls within the above range. This is because, when the Ta content or Nb content is very low, coercive force tends to lower, whereas when the content of Ta or Nb is very high, the orientation of the magnetic film is impaired, resulting in lowering of coercive force.

The orientation-determining film 2 which causes the texture of the following bcc undercoat film to be (200) may be formed from a non-magnetic alloy material containing Ta or Nb in an amount of 30 at % or more.

The orientation-determining film 2 which causes the texture of the following bcc undercoat film to be (200) is preferably formed from a non-magnetic metal having an Fd3m structure.

Preferred examples of the non-magnetic metal having an Fd3m structure include CrX alloys having a C15 structure (Skruktubercht symbol notation), such as CrNb alloys (e.g., 70 Cr30 Nb), CrTa alloys (e.g., 65 Cr35 Ta), and CrTi alloys (e.g., 64 Cr36 Ti).

Examples of the metal having an Fd3m structure, which metal may be used for forming the orientation-determining film 2, include alloys having a C15 structure, such as CoTa alloys (e.g., 65 Co35 Ta), CoNb alloys (e.g., 70 Co30 Nb), WHf alloys (e.g., 66 W34 Hf), and AlY alloys (e.g., 67 Al33 Y).

Examples of the metal having an Fd3m structure, which metal may be used for forming the orientation-determining film 2, include a CoTa alloy in which the Co content is relatively low (e.g., 50 Co50 Ta) and an FeNb alloy (e.g., 50 Fe50 Nb).

When the orientation-determining film 2 which causes the texture of the following bcc undercoat film to be (200) is formed from such a material having an Fd3m structure, the film is preferably subjected to the below-described oxidation or nitridation during film formation, to thereby regulate the crystal structure (Fd3m structure) of the film.

The orientation-determining film 2 which causes the texture of the following bcc undercoat film to be (200) serves not only as a film for determining the orientation of the non-magnetic undercoat film 3, but also as a film for reducing crystal grains in the non-magnetic undercoat film 3 and the magnetic film 4.

As shown in FIG. 1(b), the orientation-determining film 2 which causes the texture of the following bcc undercoat film to be (200) has a crystal structure in which columnar fine crystal grains 2a are inclined in a radial direction of the non-metallic substrate 1 with respect to a line 2b perpendicular to the substrate 1. The inclination angle α1 of each of the crystal grains 2a (i.e., inclination angle of each of the crystal grains 2a with respect to the perpendicular line 2b) is greater than 0° and less than 90°.

The inclination angle α1 of each of the columnar fine crystal grains 2a is 10–75°, preferably 15–75°, more preferably 20–75°, much more preferably 25–55°.

When the inclination angle α1 falls below the above range, the crystal orientation of the non-magnetic undercoat film 3 and the magnetic film 4 is impaired, and thus the magnetic anisotropy of the magnetic film is lowered. In consideration of the structure of a film formation apparatus, determining the angle α1 at a certain value exceeding the above range is difficult.

The inclination angle α1 may be at least 10° and less than 30°. Alternatively, the angle α1 maybe greater than 65° and less than 90°.

The orientation-determining film 2 which causes the texture of the following bcc undercoat film to be (200) preferably has a structure in which the columnar fine crystal grains 2a are substantially not inclined in a circumferential direction of the substrate 1.

The thickness of the orientation-determining film 2 is preferably 2–100 nm (20–1,000 Å). When the thickness falls below the above range, the magnetic anisotropy of the magnetic film is lowered, whereas when the thickness is in excess of the above range, productivity is lowered.

The non-magnetic undercoat film 3 may be formed from conventionally known materials for undercoat film. For example, the film 3 may be formed from an alloy of one or more elements of Cr, V, Ti, Si, Ta, Ni, W, Mo, and Nb. Alternatively, the film 3 may be formed from an alloy of one or more of the above elements and other elements, so long as such "other elements" do not impede the crystallinity of the film.

Particularly, the film 3 is preferably formed from Cr or a Cr alloy (e.g., a CrTi-based, CrW-based, CrMo-based, or a CrV-based alloy).

The film 3 may be formed from a material having a B2 structure, such as Ni50Al (Ni-50 at % Al).

The non-magnetic undercoat film 3 may be of a single-layer structure which is uniform in a thickness direction, or of a multi-layer structure formed of two or more different films.

The thickness of the non-magnetic undercoat film 3 is preferably 1–100 nm (10–1,000 Å), more preferably 2–50 nm (20–500 Å).

When the non-magnetic undercoat film 3 has a bcc structure, and the orientation plane of the film 3 (the predominant crystal plane in the surface of the film 3) is a (200) plane, the magnetic anisotropy of the magnetic film 4 can be enhanced, which is preferred.

When the non-magnetic undercoat film 3 is formed from Cr, the lattice constant of the film 3 greatly differs from that of the magnetic film 4. Therefore, an intermediate film formed from CrX' (wherein X' is one or more elements selected from among Mo, Ti, V, Ta, and W) is preferably provided between the non-magnetic undercoat film 3 and the magnetic film 4, in order to enhance lattice matching between the films 3 and 4.

The magnetic film 4 is preferably formed from a material containing Co. The material may be, for example, an alloy of Co and one or more elements selected from among Cr, Pt, Ta, B, Ti, Ag, Cu, Al, Au, W, Nb, Zr, V, Ni, Fe, and Mo.

Preferred, specific examples of the above material include CoPt-based alloys, CoCrPt-based alloys, CoCrPtTa-based alloys, CoCrPtB-based alloys, CoCrPtBTa-based alloys, CoCrPtTaCu-based alloys, CoCrPtTaZr-based alloys, CoCrPtTaW-based alloys, CoCrPtCu-based alloys, CoCrPtZr-based alloys, CoCrPtBCu-based alloys, CoCrPtBZr-based alloys, CoNiTa-based alloys, CoNiTaCr-based alloys, and CoCrTa-based alloys.

The magnetic film 4 may be a granular film in which magnetic particles are dispersed in a non-magnetic matrix such as a non-magnetic metal (e.g., Ag, Ti, Ru, or C), a compound of the non-magnetic metal, an oxide (e.g., $SiO_2$, SiO, or $Al_2O_3$), a nitride (e.g., $Si_3N_4$, AlN, TiN, or BN), a fluoride (e.g., CaF), or a carbide (e.g., TiC).

When the magnetic film 4 is formed from a B-containing Co alloy (for example, a CoCrB-based alloy, preferably a CoCrPtB-based alloy), the B content of the Co alloy is 1–10 at %, preferably 2–7 at %, more preferably 2.5–6 at %. When the B content falls below the above range, coercive force is lowered, and magnetic crystal grains become large, resulting in an increase in noise. In contrast, when the B content is in excess of the above range, the orientation of the magnetic film may be lowered, resulting in lowering of coercive force.

The Cr content of the Co alloy is 40 at % or less, preferably 5–35 at %, more preferably 10–25 at %.

The Pt content of the Co alloy is 1–30 at %, preferably 3–27 at %, more preferably 6–25 at %.

The magnetic film 4 may be of a single-layer structure, or of a multi-layer structure formed of two or more different films.

The thickness of the magnetic film 4 is 5–30 nm (50–300 Å).

When the hcp magnetic film 4 has a (110) texture, the magnetic anisotropy of the film 4 can be enhanced, which is preferred.

The protective film 5 may be formed from a conventionally known material. For example, the film may be formed from a material containing a single component such as carbon, silicon oxide, silicon nitride, or zirconium oxide; or a material predominantly containing such components.

The thickness of the protective film 5 is preferably 2–10 nm (20–100 Å).

The lubrication film 6 may be formed from a fluorine-based lubricant such as perfluoropolyether.

In the magnetic recording medium having the aforementioned structure, the ratio of a coercive force in a circumferential direction of the medium (Hcc) to a coercive force in a radial direction of the medium (Hcr); i.e., Hcc/Hcr, is greater than 1 (preferably 1.1 or more, more preferably 1.2 or more).

When the ratio Hcc/Hcr falls below the above range, the magnetic anisotropy of the magnetic recording medium is insufficient, and thus magnetic characteristics of the medium, such as thermal stability, error rate, and S/N ratio, are unsatisfactory.

An embodiment of the production process for a magnetic recording medium of the present invention will next be described by taking, as an example, production of the aforementioned magnetic recording medium.

Figure 2:
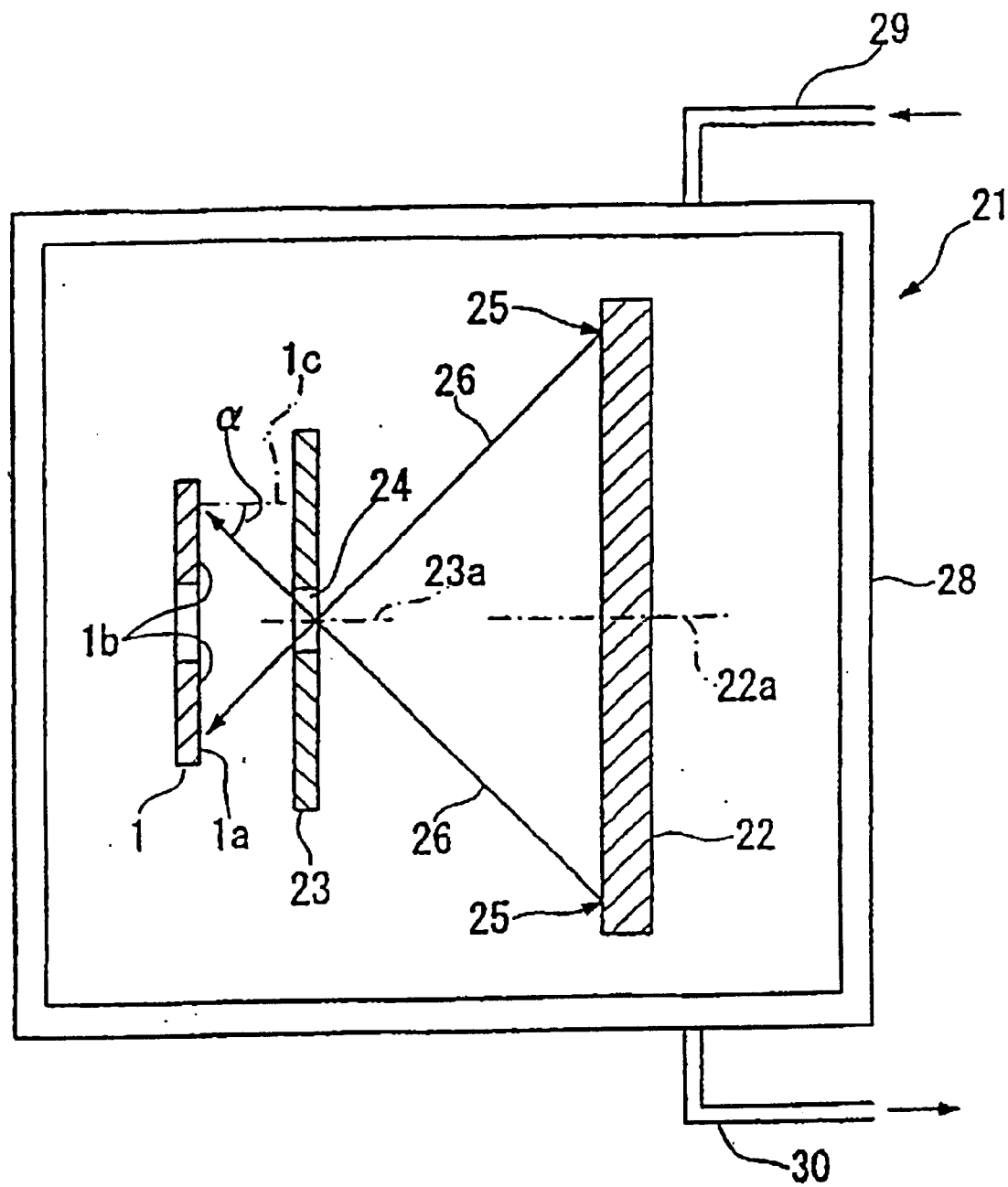
FIG. 2 is a schematic representation showing an embodiment of the production apparatus for the magnetic recording medium of the present invention.

FIG. 2 shows an embodiment of the apparatus for producing the magnetic recording medium of the present invention.

A sputtering apparatus 21 shown in FIG. 2 is employed for forming the orientation-determining film 2 on the non-metallic substrate 1. The apparatus 21 contains a chamber 28 which is provided with a sputtering target 22 serving as a release source for releasing film formation particles, and a shielding plate 23 serving as means for determining the direction of the trajectory of the film formation particles released from the sputtering target 22.

Reference numeral 29 represents a feed line for feeding, for example, a sputtering gas into the chamber 28. Reference numeral 30 represents a discharge line for discharging, for example, a sputtering gas from the chamber 28 to the outside.

The sputtering target 22 contains a material constituting the orientation-determining film 2, and assumes a disk shape.

The shielding plate 23 is provided for determining the direction of the trajectory of film formation particles released from the sputtering target 22 by means of shielding the particles released in non-intended directions. The shielding plate 23 assumes a disk shape, and has, in its substantially central portion, a circular through-hole 24 through which the film formation particles pass.

The shielding plate 23 is provided such that the plate 23 is substantially parallel to the sputtering target 22 and a predetermined distance is provided between the plate 23 and the target 22.

The shielding plate 23 is provided such that the axis 23a of the plate 23 substantially coincides with the axis 22a of the sputtering target 22.

In order to enhance the accuracy of the incident angle of the film formation particles, the shielding plate 23 is preferably thinned as much as possible. For example, when the employed non-metallic substrate 1 has an outer diameter of 2.5 inches (63.5 mm), the thickness of the shielding plate 23 is 1.5–5 mm, preferably 2–4 mm.

The shielding plate 23 is preferably formed from a metallic material exhibiting excellent heat resistance and producing few impurities, such as stainless steel or an aluminum alloy. Particularly, the plate 23 is preferably formed from an aluminum alloy, since film formation particles deposited onto the plate are easily removed, and the alloy is inexpensive.

The inner diameter of the through-hole 24 is determined such that the incident angle α of released film formation particles is 10–75° with respect to the non-metallic substrate 1 when the particles are deposited onto a region 1b of the surface 1a of the substrate 1 on which the orientation-determining film is to be formed.

The incident angle α is an angle with respect to a line 1c perpendicular to the non-metallic substrate 1.

The inner diameter of the through-hole 24 is preferably reduced to the greatest possible extent, so long as film formation efficiency is not lowered. For example, when the employed non-metallic substrate 1 has an outer diameter of 2.5 inches (63.5 mm), the inner diameter of the through-hole 24 is 20 mm or less, preferably 15 mm or less, more preferably 7 mm or less.

When the orientation-determining film 2 is formed by use of the sputtering apparatus 21, the non-metallic substrate 1 is placed in the chamber 28, and the substrate 1 is provided such that the substrate 1 faces the sputtering target 22 with the shielding plate 23 therebetween (i.e., on the left side as shown in FIG. 2). In this case, the non-metallic substrate 1 is provided so as to be substantially parallel to the sputtering target 22 and the shielding plate 23.

Subsequently, while a sputtering gas such as argon is fed into the chamber 28 through the feed line 29, electricity is supplied to the sputtering target 22, to thereby release film formation particles from the target through sputtering.

Among the film formation particles released from release portions 25 located at a distance from—but on the sputtering target 22—the center portion of the sputtering target 22, the particles directed to the center portion of the shielding plate 23 pass through the through-hole 24, and the rest of the particles are shielded by the shielding plate 23.

Figure 3:
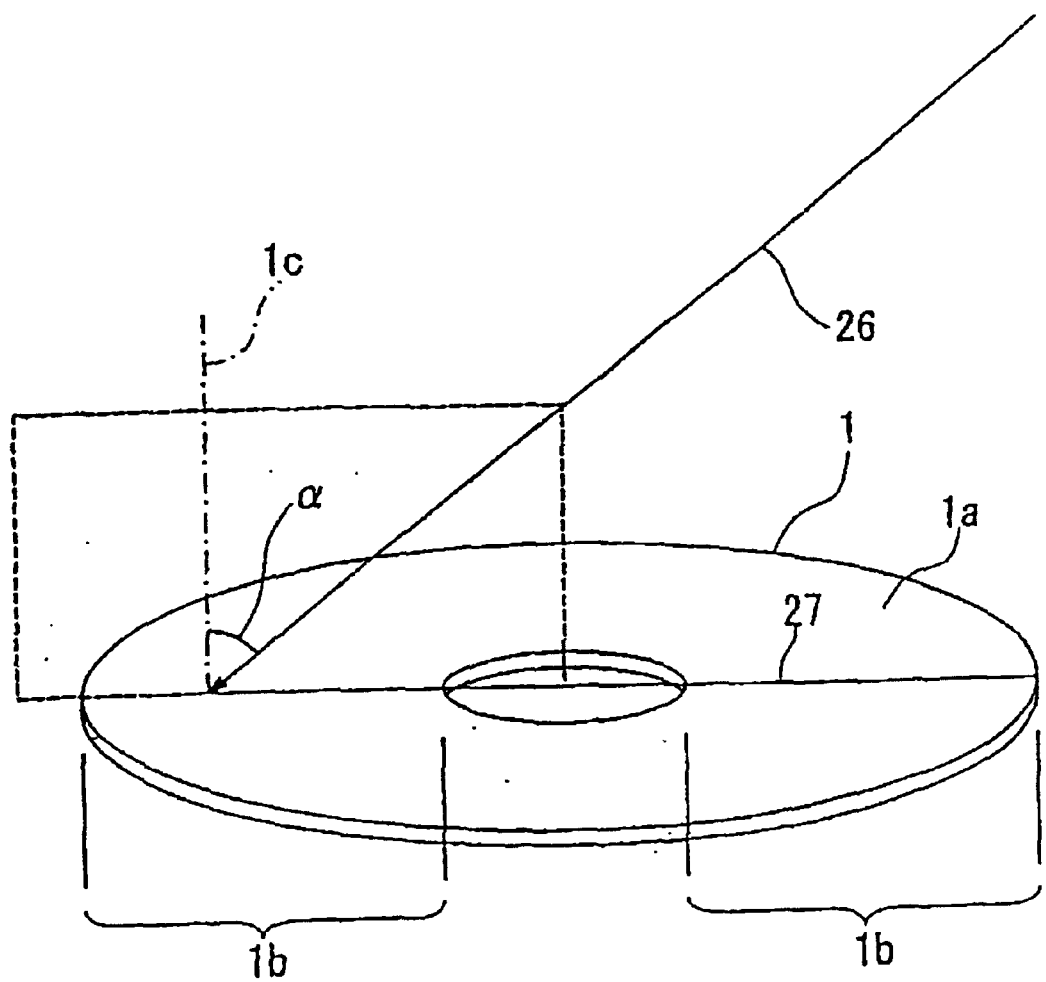
FIG. 3 is an explanatory view showing an embodiment of the production process for the magnetic recording medium of the present invention.

As shown in FIGS. 2 and 3, the film formation particles released from the release portions 25 located at a distance from—but on the sputtering target 22—the center portion of the target 22 pass through the through-hole 24 provided at the center portion of the shielding plate 23.

Therefore, a projection line 27 of the trajectory 26 of the particles formed on the surface 1a of the non-metallic substrate 1 lies along a radial direction of the substrate 1 (see FIG. 3).

The film formation particles are deposited onto the surface 1a uniformly in a circumferential direction of the substrate 1.

The film formation particles are deposited onto the circular region 1b of the surface 1a on which the orientation-determining film is to be formed, such that the incident angle α of the particles is 10–75°.

The incident angle α is preferably 15–75°, more preferably 20–75°, much more preferably 25–55°.

When the incident angle α falls below the range mentioned above, the crystal orientation of the non-magnetic undercoat film 3 and the magnetic film 4 is impaired, and the magnetic anisotropy of the magnetic film is lowered. In consideration of the configuration of the apparatus, determining the incident angle α at a value exceeding the above range is difficult.

The incident angle α may be at least 10° and less than 30°. Alternatively, the angle α may be in excess of 65° and less than 75°.

When the incident angle α is determined so as to fall within the above range, as shown in FIG. 1(b), the orientation-determining film 2 has a crystal structure in which the columnar fine crystal grains 2a are inclined in a radial direction of the non-metallic substrate 1 with respect to the line 2b perpendicular to the substrate 1.

The orientation-determining film 2 is preferably subjected to oxidation or nitridation.

In order to carry out the oxidation or nitridation, when the orientation-determining film 2 is formed by use of the sputtering apparatus 21, an oxygen- or nitrogen-containing sputtering gas may be fed into the chamber 28 through the feed line 29.

The oxygen-containing sputtering gas may be a gas mixture of oxygen and argon. The nitrogen-containing sputtering gas may be a gas mixture of nitrogen and argon.

The oxygen content or nitrogen content of the sputtering gas is preferably 1–50 vol %.

In the present invention, the oxidation or nitridation may be carried out by bringing the orientation-determining film 2 into contact with an oxygen- or nitrogen-containing gas, after completion of formation of the film 2.

The oxygen-containing gas may be air, pure oxygen, or steam. Alternatively, the oxygen-containing gas may be an oxygen-rich gas which consists of air containing a large amount of oxygen.

The nitrogen-containing gas may be air, pure nitrogen, or a nitrogen-rich gas.

Specifically, in order to bring the orientation-determining film 2 into contact with the oxygen- or nitrogen-containing gas, after the film 2 is formed on the substrate 1 in the sputtering apparatus 21 as described above, the oxygen- or nitrogen-containing gas is fed into the chamber 28 of the apparatus 21 through is the feed line 29.

The oxygen content or nitrogen content of the oxygen- or nitrogen-containing gas is preferably 1–100 vol %.

Use of such an oxygen- or nitrogen-containing gas facilitates oxidation or nitridation of the film 2.

Through the oxidation or nitridation, at least the area in proximity to the surface of the orientation-determining film 2 is oxidized or nitridized.

In one method for carrying out the oxidation or nitridation, the orientation-determining film 2 is formed by use of an oxygen- or nitrogen-containing sputtering gas, and then the film 2 is brought into contact with an oxygen- or nitrogen-containing gas.

The non-magnetic undercoat film 3 and the magnetic film 4 may be formed through sputtering.

Being grown under the influence of the orientation-determining film 2, the non-magnetic undercoat film 3 exhibits excellent crystal orientation. The non-magnetic undercoat film 3 has a bcc structure, and the orientation plane of the film 3 (the predominant crystal plane in the surface of the film 3) is a (200) plane.

Since the non-magnetic undercoat film 3 exhibits excellent crystal orientation, the crystal orientation of the magnetic film 4 formed on the film 3 is enhanced. Preferably, the magnetic film 4 has an hcp structure, and the orientation plane of the film 4 is a (110) plane.

The protective film 5 may be formed through plasma CVD or sputtering.

The lubrication film 6 may be formed by applying a lubricant such as a fluorine-based liquid lubricant (e.g., perfluoropolyether) onto the protective film 5 through dipping.

In the magnetic recording medium of the embodiment, the orientation-determining film 2, which determines the crystal orientation of a film provided directly thereon, is formed between the non-metallic substrate 1 and the non-magnetic undercoat film 3, and the film 2 has a crystal orientation such that the columnar fine crystal grains 2a are inclined in a radial direction of the substrate 1. Therefore, the crystal orientation of the non-magnetic undercoat film 3 and the magnetic film 4 can be improved, and the magnetic anisotropy of the magnetic film 4 in a circumferential direction can be enhanced.

In general, a medium which has a high crystal magnetic anisotropy constant (Ku) has excellent thermal stability. In the magnetic recording medium of the embodiment, thermal stability is thought to be enhanced, since the crystal magnetic anisotropy constant (Ku) is enhanced by enhancement of magnetic anisotropy in a circumferential direction.

As used herein, the term "thermal decay" refers to a phenomenon in which recording bits become unstable and recorded data are thermally lost. In a magnetic recording apparatus, thermal decay is manifested in the form of reduction in reproduction output of recorded data with passage of time.

According to the production process of the present invention, the half power width of a reproduction output peak is narrowed, and thus the resolution of the reproduction output can be enhanced. Therefore, a magnetic recording medium of improved error rate can be produced.

When magnetic anisotropy is enhanced, coercive force and reproduction output (S) can be improved, yielding an improvement in the S/N ratio.

In addition, crystal grains in the non-magnetic undercoat film 3 become fine. Consequently, magnetic grains in the magnetic film 4 which is grown under the influence of the film 3 can become fine and uniform, resulting in reduction in noise (N).

Therefore, when the film 4 is thinned, excessive growth of the magnetic grains is suppressed, and the grains can become even finer, resulting in further reduction in noise. Consequently, the S/N ratio can be further improved.

As a result, magnetic characteristics of the magnetic recording medium, such as thermal stability, error rate, and S/N ratio, can be enhanced, and thus recording density can be increased.

The magnetic anisotropy of the magnetic recording medium having the aforementioned structure can be enhanced without carrying out texturing during production of the medium. Therefore, a texturing step is not necessary during production of the medium, and thus the production process is simplified and production costs can be reduced.

In addition, deterioration of glide height characteristics can be prevented, which deterioration occurs when the orientation-determining film 2 is subjected to texturing, the surface of the film 2 becomes rough, and the average surface roughness (Ra) of the medium increases.

When the orientation-determining film 2 is formed from a non-magnetic metal having an Fd3m structure, the crystal orientation of the non-magnetic undercoat film 3 and the magnetic film 4 is improved, and the magnetic anisotropy of the magnetic film 4 can be enhanced.

In the production process of the aforementioned embodiment, when film formation particles are released from the sputtering target 22 and deposited onto the surface 1a of the non-metallic substrate 1, to thereby form the orientation-determining film 2, the direction of the trajectory of the film formation particles is determined such that the projection line 27 of the trajectory 26 of the particles formed on the substrate 1 lies along a radial direction of the substrate 1, and the incident angle $\alpha$ of the trajectory is 10–75° with respect to the substrate 1. Therefore, the magnetic anisotropy of the magnetic film 4 can be enhanced.

Consequently, magnetic characteristics of the magnetic recording medium, such as thermal stability, error rate, and S/N ratio, can be enhanced, and thus recording density can be increased.

Since a texturing step is not necessary during production of the medium, the production process is simplified and production costs can be reduced. In addition, deterioration of glide height characteristics can be prevented, which deterioration occurs when the orientation-determining film 2 is subjected to texturing, the surface of the film 2 becomes rough, and the average surface roughness (Ra) of the medium increases.

Oxidation or nitridation of the surface of the orientation-determining film 2 can further enhance the magnetic anisotropy of the magnetic film 4, improve magnetic characteristics of the magnetic recording medium, such as thermal stability, error rate, and S/N ratio, and realize high recording density.

In the aforementioned production process, formation of the orientation-determining film 2 is carried out easily, since the film 2 is formed through sputtering by use of the sputtering target 22 serving as a release source of film formation particles.

When the orientation-determining film 2 is formed by use of an oxygen- or nitrogen-containing sputtering gas, formation of the film 2, and oxidation or nitridation of the film 2 can be carried out in a single step, and thus the production step can be simplified. Consequently, operation is simplified and productivity can be enhanced.

When the oxidation or nitridation of the orientation-determining film 2 is carried out by bringing the film 2 into contact with an oxygen- or nitrogen-containing gas, firstly the film 2 is formed on the non-metallic substrate 1 in the sputtering apparatus 21, and subsequently, without removal of the thus-formed medium substrate M from the apparatus 21, the film 2 is subjected to oxidation or nitridation in the same apparatus 21.

Therefore, simplification of the production step and operation, and enhancement of productivity can be attained.

The aforementioned sputtering apparatus 21 includes the sputtering target 22 serving as a release source of film formation particles, and the shielding plate 23 for determining the direction of the trajectory of the released film formation particles, and thus the incident direction of the trajectory of the particles with respect to the non-metallic substrate 1 can be accurately determined.

Therefore, the crystal orientation of the non-magnetic undercoat film 3 and the magnetic film 4 is improved, and the magnetic anisotropy of the magnetic film 4 can be reliably enhanced.

Figure 4:
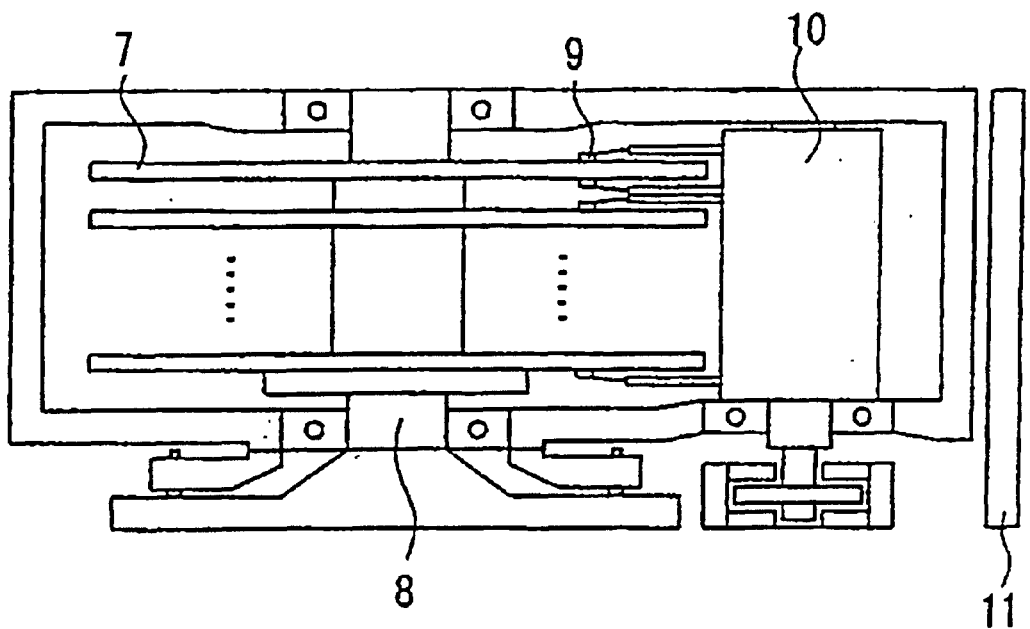
FIG. 4 is a partial cross-sectional view showing an embodiment of the magnetic recording and reproducing apparatus of the present invention.

FIG. 4 shows an embodiment of the magnetic recording and reproducing apparatus including the aforementioned magnetic recording medium. The apparatus includes a magnetic recording medium 7, the structure of the medium being shown in FIG. 1; a medium-driving portion 8 which rotates the medium 7; a magnetic head 9 which is employed for recording of data onto the medium 7 and for reproduction of the data from the medium 7; a head-driving portion 10; and a recorded/reproduced signal-processing system 11. In the system 11, input data are processed and recording signals are sent to the magnetic head 9, or reproduction signals from the head 9 are processed and the resultant data are output.

When the magnetic recording and reproducing apparatus is employed, recording density can be increased, since the magnetic anisotropy of the magnetic recording medium can be enhanced, and thus S/N ratio and error rate can be improved. In addition, problems, including loss of recorded data attributed to thermal decay, can be prevented.

In the present invention, the orientation-determining film may be formed from an NiP alloy.

FIG. 1(a) shows an example of the magnetic recording medium including the orientation-determining film formed from an NiP alloy.

A second embodiment of the magnetic recording medium of the present invention will be described with reference to FIG. 1(a).

In the magnetic recording medium of the second embodiment, preferably, the orientation-determining film 2 is formed from an NiP alloy, and the Ni content of the alloy is 50–90 at %.

The orientation-determining film 2 containing an NiP alloy may be formed in a manner similar to that of the aforementioned production process.

Specifically, the sputtering apparatus 21 including the sputtering target 22 containing an NiP alloy and the shielding plate 23 is employed, and film formation particles released from the sputtering target 22 are deposited onto the surface 1a of the non-metallic substrate 1 such that the incident angle α of the trajectory of the particles is 10–75° with respect to the substrate 1.

When the orientation-determining film 2 is formed, the film 2 is subjected to oxidation or nitridation through the aforementioned process, by employing an oxygen- or nitrogen-containing sputtering gas or by bringing the film 2 into contact with an oxygen- or nitrogen-containing gas. Consequently, at least the surface of the orientation-determining film 2 may be crystallized.

In the resultant magnetic recording medium, the ratio of a coercive force in a circumferential direction of the medium (Hcc) to a coercive force in a radial direction of the medium (Hcr); i.e., Hcc/Hcr, is more than 1, preferably 1.1 or more, more preferably 1.2 or more.

The thus-produced magnetic recording medium includes the orientation-determining film 2 formed from an NiP alloy, and the ratio of a coercive force in a circumferential direction of the medium (Hcc) to a coercive force in a radial direction of the medium (Hcr); i.e., Hcc/Hcr, is more than 1. Therefore, similar to the case of the magnetic recording medium of the first embodiment, the crystal orientation of the non-magnetic undercoat film 3 and the magnetic film 4 is improved, and the magnetic anisotropy of the magnetic film can be enhanced.

Consequently, magnetic characteristics of the magnetic recording medium, such as thermal stability, error rate, and S/N ratio, can be enhanced, and thus recording density can be increased.

The magnetic anisotropy of the magnetic recording medium can be enhanced without carrying out texturing during production of the medium. Therefore, the production process is simplified and production costs can be reduced.

Figure 5:
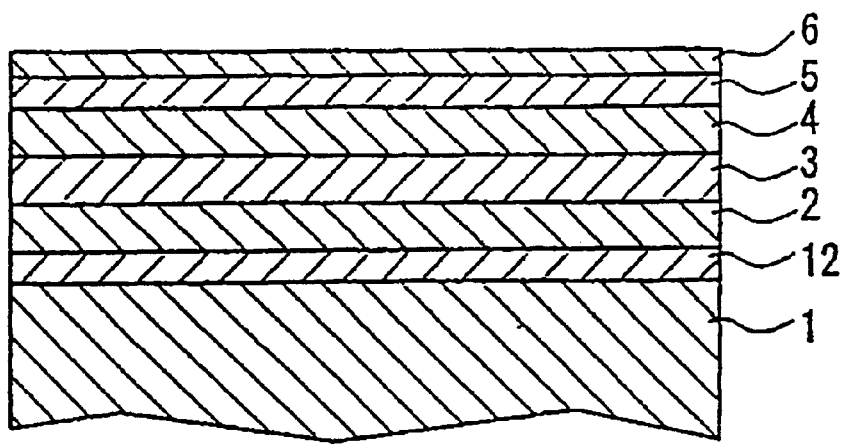
FIG. 5 is a partial cross-sectional view showing another embodiment of the magnetic recording medium of the present invention.

As shown in FIG. 5, the magnetic recording medium of the present invention may include an orientation-enhancing film 12 provided between the non-metallic substrate 1 and the orientation-determining film 2, the film 12 being formed through sputtering.

The orientation-enhancing film 12 is provided for regulating the orientation of the orientation-determining film 2 and for preventing exfoliation of the film 2 from the substrate 1. The orientation-enhancing film 12 may be formed from an alloy predominantly containing one or more elements selected from among Cr, Mo, Nb, V, Re, Zr, W, and Ti. Particularly, the film 12 is preferably formed from Cr, or a CrMo-, CrTi-, CrV-, or CrW-based alloy.

The film 12 may be formed from a material having a B2 structure or an amorphous structure.

Examples of the material having a B2 structure include Ni50Al (Ni-50 at % Al), Co50Al (Co-50 at % Al), and Fe50Al (Fe-50 at % Al).

Examples of the material having an amorphous structure include CuZr-, TiCu-, NbNi- and NiP-based alloys.

Preferred, specific examples of the material of the orientation-enhancing film 12 include a material predominantly containing any one of NiAl, FeAl, CoAl, CoZr, CoCrZr, and CoCrC.

The thickness of the orientation-enhancing film 12 is preferably 200 nm or less; for example, 5–200 nm. When the thickness is in excess of 200 nm, the film 12 fails to exert the effect of enhancing the magnetic anisotropy of the magnetic film 4.

As shown in FIG. 5, when the orientation-enhancing film 12 is provided in the magnetic recording medium, disturbance of the orientation of the orientation-determining film 2, which occurs during an initial stage of its growth, is prevented. Furthermore, the crystal orientation of the non-magnetic undercoat film 3 and the magnetic film 4 is improved, and thus the magnetic anisotropy of the magnetic film 4 can further be enhanced.

In addition, exfoliation of the orientation-determining film 2 from the non-metallic substrate 1 can be prevented.

Figure 6:
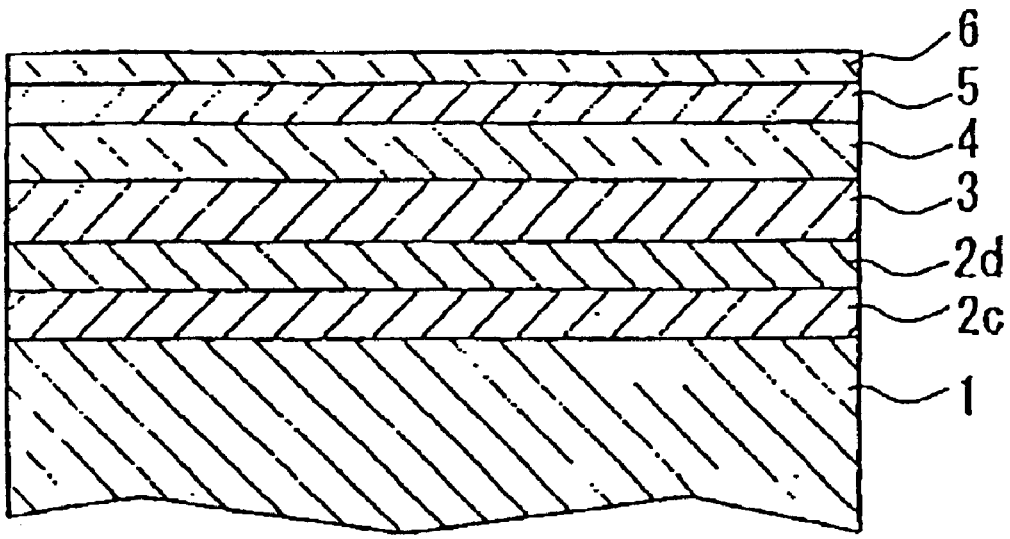
FIG. 6 is a partial cross-sectional view showing yet another embodiment of the magnetic recording medium of the present invention.

In the present invention, as shown in FIG. 6, a plurality of orientation-determining films may be provided. The magnetic recording medium shown in FIG. 6 includes a first orientation-determining film 2c and a second orientation-determining film 2d. The material and thickness of the orientation-determining films 2c and 2d may be similar to those of the orientation-determining film 2 of the magnetic recording medium shown in FIG. 1. Three or more orientation-determining films may be provided.

Figure 7:
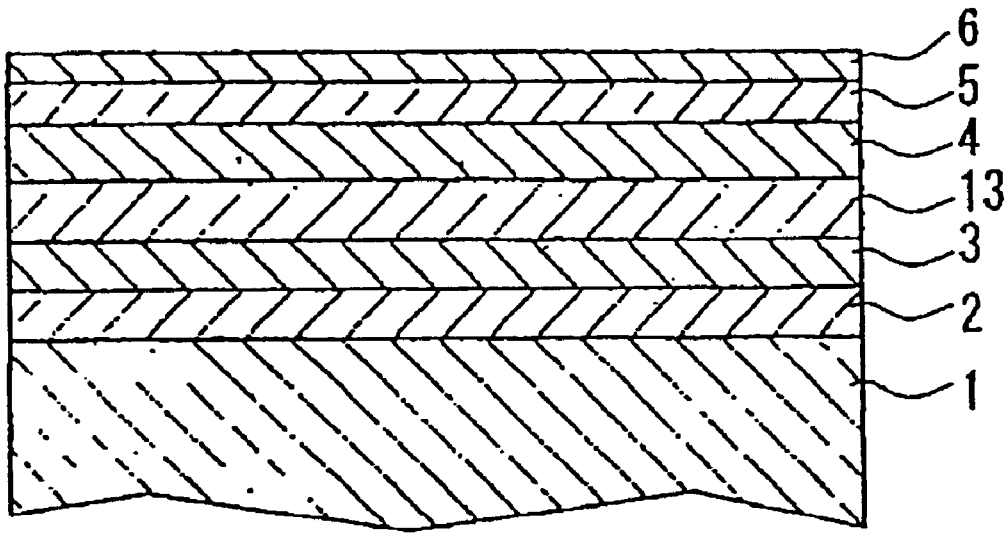
FIG. 7 is a partial cross-sectional view showing yet another embodiment of the magnetic recording medium of the present invention.

In the present invention, as shown in FIG. 7, a non-magnetic intermediate film 13 formed from, for example, CoCr may be provided between the non-magnetic undercoat film 3 and the magnetic film 4.

When the non-magnetic intermediate film 13 is provided, disturbance of initial growth of the magnetic film 4 is prevented, and the orientation of the magnetic film 4 is enhanced, and thus excellent magnetic characteristics can be obtained.

Figure 8:
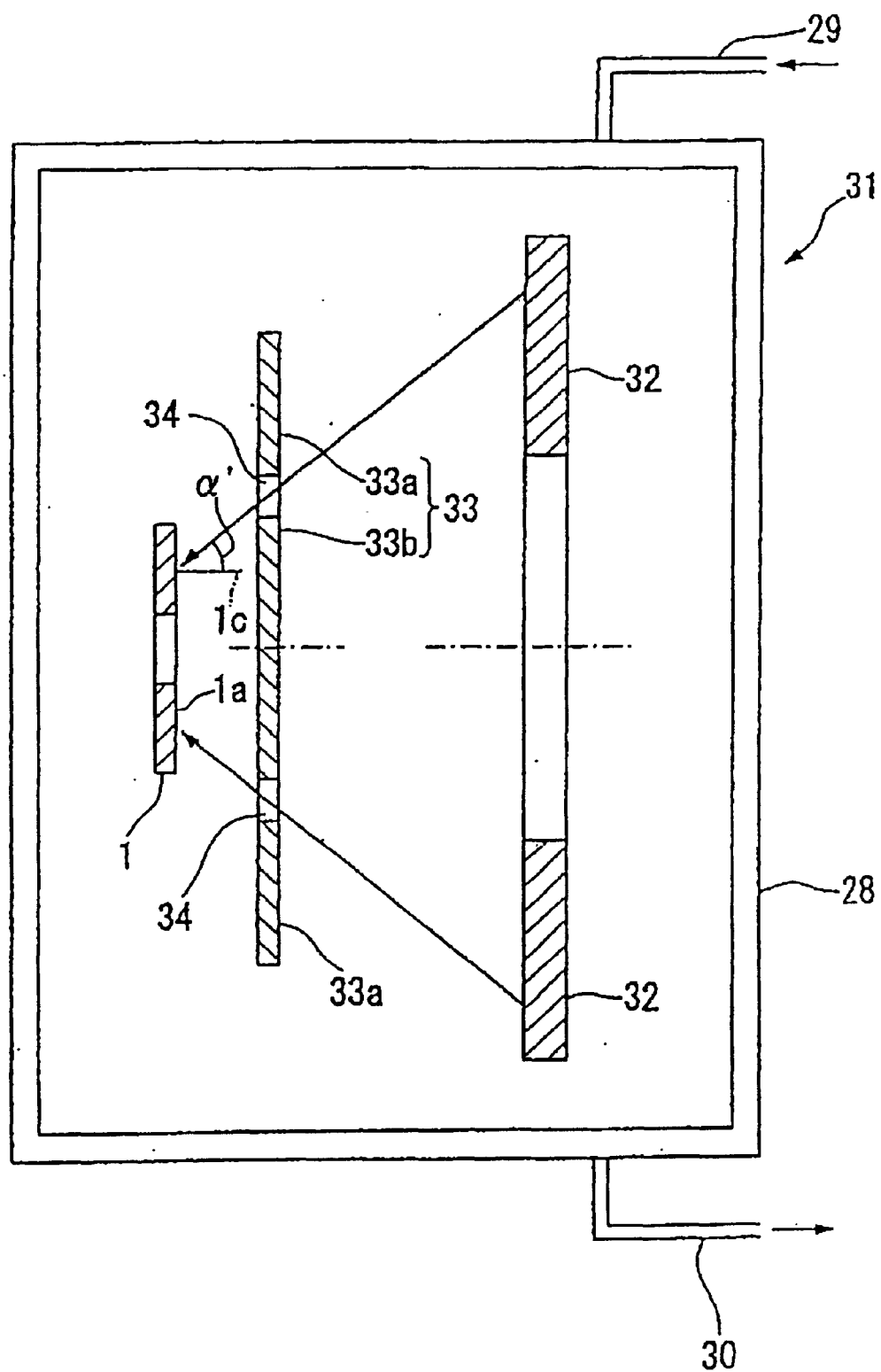
FIG. 8 is a schematic representation showing another embodiment of the production apparatus for the magnetic recording medium of the present invention.

FIG. 8 shows another embodiment of the apparatus for producing the magnetic recording medium of the present invention. A sputtering apparatus 31 shown in FIG. 7 differs from the sputtering apparatus 21 shown in FIG. 2 in that a sputtering target 32 serving as a release source of film formation particles assumes an annular shape, and that a shielding plate 33 includes an annular outer shielding plate 33a and a disk-shaped inner shielding plate 33b provided in the aperture of the shielding plate 33a.

The outer diameter of the inner shielding plate 33b is smaller than the inner diameter of the outer shielding plate 33a. The shielding plate 33 also includes a slit 34 through which film formation particles pass, the slit 34 being formed between the inner periphery of the shielding plate 33a and the outer periphery of the shielding plate 33b.

The inner diameter of the outer shielding plate 33a and the outer diameter of the inner shielding plate 33b are determined such that the incident angle α' of the trajectory of released film formation particles is 10–75° with respect to the non-metallic substrate 1 when the particles are deposited onto the substrate 1.

When the orientation-determining film 2 is formed by use of the sputtering apparatus 31, film formation particles which have been released from the sputtering target 32 and have passed through the slit 34 are deposited onto the surface 1a of the non-metallic substrate 1 such that the incident angle α' of the trajectory of the particles is 10–75° with respect to the substrate 1.

In the present invention, when the non-magnetic undercoat film 3 and the magnetic film 4 are formed by use of the sputtering apparatus 21 or 31, the direction of the trajectory of film formation particles may be determined such that the projection line of the trajectory of the particles formed on a deposition surface lies along a radial direction of the non-metallic substrate, and the incident angle of the trajectory is 10–75° with respect to the substrate.

In this case, the magnetic anisotropy of the magnetic film 4 can further be enhanced.

In the present invention, the orientation-determining film may be formed through, instead of sputtering, any physical vapor deposition method such as vacuum deposition, gas sputtering, gas-flow sputtering, or an ion-beam method.

EXAMPLES

The present invention will next be described in detail by way of Examples.

Test Example 1

A magnetic recording medium which did not contain an orientation-determining film 2 but which otherwise was similar to the magnetic recording medium shown in FIG. 1(a) was produced as follows.

Through sputtering by use of a DC magnetron sputtering apparatus (Model 3010, product of ANELVA), on a non-metallic substrate 1 (amorphous glass, diameter: 65 mm, thickness: 0.635 mm) were formed a non-magnetic undercoat film 3 containing a CrMo alloy (thickness of the film: 30 nm), a magnetic film 4 containing a CoCrPtTa alloy (thickness of the film: 25 nm), and a protective film 5 containing carbon (thickness of the film: 10 nm). Subsequently, a lubrication film 6 containing perfluoropolyether was formed on the protective film 5 through dipping.

During film formation, the chamber of the apparatus was evacuated to $2 \times 10^{-7}$ Pa. The non-metallic substrate 1 was heated to 200° C. Argon gas was used as a sputtering gas.

Magnetostatic characteristics of the thus-produced magnetic recording medium were measured by use of a vibrating sample magnetometer (VSM). The ratio of a coercive force in a circumferential direction of the medium (Hcc) to a coercive force in a radial direction of the medium (Hcr); i.e., Hcc/Hcr, was measured, and the ratio was regarded as an index of magnetic anisotropy. The ratio is shown in the column "magnetic anisotropy" of Table 1.

Read-write performance of the magnetic recording medium were measured by use of read/write analyzer RWA1632 and spin stand S1701MP (products of GUZIK). In order to evaluate read-write performance, measurement was performed by use of, as a magnetic head, a complex-type thin film magnetic recording head containing a giant magnetoresistive (GMR) element at the reproduction portion, and track-recording density was set at 350 kFCI.

By use of the spin stand S1701MP, thermal stability (thermal decay) of the magnetic recording medium was measured in terms of reduction in output at a recording density of 40 kFCI at 70° C. In Table 1, the symbol "PW50" refers to half power width of output peak, and the symbol "S/N" refers to the ratio of reproduction output to noise. The test results are shown in Table 1.

Test Examples 2 through 17

A magnetic recording medium as shown in FIG. 1 was produced as follows.

An orientation-determining film 2 was formed on a non-metallic substrate 1 by use of a sputtering apparatus 21. During film formation, the direction of the trajectory 26 of film formation particles was determined such that a projection line 27 of the trajectory 26 formed on the non-metallic substrate 1 lied along a radial direction of the substrate 1, and the incident angle of the trajectory was 10–75° with respect to the substrate 1.

When the orientation-determining film 2 was formed, a gas mixture of nitrogen and argon (nitrogen content: 20 vol %) was used as a sputtering gas. Films 3 through 6 were formed under conditions similar to those of Test Example 1.

A cross section of the thus-produced magnetic recording medium was observed under a TEM, which revealed that the orientation-determining film 2 has a crystal structure such that columnar fine crystal grains 2a are inclined at 10–75° in a radial direction of the medium.

The test results are shown in Table 1.

Test Examples 18 and 19

The procedure of Test Examples 2 through 17 was repeated, except that a shielding plate 23 was not used during formation of the orientation-determining film 2 and that the incident angle of the trajectory of film formation particles was not restricted, to thereby produce a magnetic recording medium.

The test results are shown in Table 2.

Test Examples 20 through 30

The procedure of Test Examples 2 through 17 was repeated, except that a gas mixture of argon and nitrogen (nitrogen content: shown in Table 3) was used as a sputtering gas during formation of the orientation-determining film 2, to thereby produce a magnetic recording medium.

The nitrogen content for Test Example 26 of the orientation-determining film was 10 at % by the auger electron spectrometer.

The orientation-determining film 2 which causes the texture of the following bcc undercoat film to be (200) had a crystal structure in which columnar fine crystal grains 2a were inclined at 10–75° in a radial direction of the medium.

The test results are shown in Table 3.

Test Examples 31 through 39

The procedure of Test Examples 2 through 17 was repeated, except that the orientation-determining film 2 was formed from a material shown in Table 4, to thereby produce a magnetic recording medium.

The orientation-determining film 2 had a crystal structure in which columnar fine crystal grains 2a were inclined at 10–75° in a radial direction of the medium.

The test results are shown in Table 4.

Test Examples 40 through 48

The procedure of Test Examples 2 through 17 was repeated, except that a gas mixture of argon and oxygen (oxygen content: shown in Table 5) was used as a sputtering gas during formation of the orientation-determining film 2, to thereby produce a magnetic recording medium.

The oxygen content for Test Example 41 of the orientation-determining film was 4 at % by the auger electron spectrometer.

The orientation-determining film 2 had a structure in which columnar fine crystal grains 2a were inclined at 10–75° in a radial direction of the medium.

The test results are shown in Table 5.

Test Example 49

The procedure of Test Example 34 was repeated, except that argon was used as a sputtering gas during formation of the orientation-determining film 2, to thereby produce a magnetic recording medium.

The orientation-determining film 2 had a structure in which columnar fine crystal grains 2a were inclined at 10–75° in a radial direction of the medium.

The test results are shown in Table 6.

Test Examples 50 through 69

The procedure of Test Example 49 was repeated, except that the orientation-determining film 2 was exposed to an exposure gas shown in Table 6 after the film 2 was formed, to thereby produce a magnetic recording medium (note: in Test Examples 52, 55, 57, 59, 62, 65, and 68, the film 2 was not exposed to the exposure gas).

The orientation-determining film 2 had a crystal structure in which columnar fine crystal grains 2a were inclined at 10–75° in a radial direction of the medium.

The test results are shown in Table 6.

Test Examples 70 through 90

The procedure of Test Examples 2 through 17 was repeated, except that an orientation-enhancing film 12 was formed on the non-metallic substrate 1 before formation of the orientation-determining film 2, to thereby produce a magnetic recording medium.

The orientation-determining film 2 had a crystal structure in which columnar fine crystal grains 2a were inclined at 10–75° in a radial direction of the medium.

The test results are shown in Table 7.

Test Examples 91 through 115

The procedure of Test Examples 2 through 17 was repeated, except that the orientation-determining film 2 and the non-magnetic undercoat film 3 were formed from materials shown in Table 8, to thereby produce a magnetic recording medium.

The orientation-determining films for the test examples from 99 through 115 are non-CrX-based alloy.

In each of Test Examples 94, 97, 102, 108, 111, and 115, a gas mixture of argon and nitrogen (nitrogen content: shown in Table 8) was used as a sputtering gas during formation of the orientation-determining film 2.

In other Test Examples, argon was used as a sputtering gas.

The orientation-determining film 2 had a crystal structure in which columnar fine crystal grains 2a were inclined at 10–75° in a radial direction of the medium.

The test results are shown in Table 8.

Test Examples 116 through 127

The procedure of Test Examples 49 through 69 was repeated, except that the orientation-determining film 2 and the non-magnetic undercoat film 3 were formed from materials shown in Table 9 and that an exposure gas shown in Table 9 was used, to thereby produce a magnetic recording medium.

In Table 9, the term "No" in the column "angle determination" refers to the case in which the incident angle of the trajectory of film formation particles was not restricted by virtue of not employing the shielding plate 23 during formation of the orientation-determining film 2. The test results are shown in Table 9.

TABLE 1

| | Orientation-determining film | | Magnetostatic characteristics | | | | Thermal | Orientation plane | |
|---|---|---|---|---|---|---|---|---|---|
| | Composition (at %) | Thickness (nm) | Coercive force (Oe) | Magnetic anisotropy (-) | PW50 (ns) | S/N (dB) | decay (%/decade) | Undercoat film | Magnetic film |
| Test Ex. 1 | — | — | 2213 | 1.00 | 16.93 | 12.90 | 0.86 | 110 | 101 |
| Test Ex. 2 | 90Cr10B | 20 | 3287 | 1.21 | 15.70 | 17.38 | 0.39 | 200 | 110 |
| Test Ex. 3 | 95Cr5C | 20 | 2944 | 1.17 | 16.07 | 16.17 | 0.43 | 200 | 110 |
| Test Ex. 4 | 90Cr10N | 20 | 2973 | 1.15 | 16.09 | 16.11 | 0.44 | 200 | 110 |
| Test Ex. 5 | 95Cr5O | 20 | 3048 | 1.16 | 16.01 | 16.37 | 0.43 | 200 | 110 |
| Test Ex. 6 | 85Cr15Al | 20 | 3253 | 1.18 | 15.79 | 17.07 | 0.40 | 200 | 110 |
| Test Ex. 7 | 85Cr15Ti | 20 | 3471 | 1.23 | 15.49 | 18.05 | 0.36 | 200 | 110 |
| Test Ex. 8 | 70Cr30Ti | 20 | 3319 | 1.22 | 15.65 | 17.55 | 0.38 | 200 | 110 |
| Test Ex. 9 | 45Cr55Ti | 20 | 2399 | 0.97 | 17.22 | 11.40 | 0.88 | 110 | 101 |
| Test Ex. 10 | 85Cr15V | 20 | 3622 | 1.31 | 15.16 | 19.14 | 0.32 | 200 | 110 |
| Test Ex. 11 | 80Cr20Nb | 20 | 3591 | 1.29 | 15.24 | 18.88 | 0.33 | 200 | 110 |
| Test Ex. 12 | 70Cr30Nb | 20 | 3631 | 1.30 | 15.18 | 19.08 | 0.32 | 200 | 110 |
| Test Ex. 13 | 60Cr40Nb | 20 | 3477 | 1.25 | 15.44 | 18.23 | 0.35 | 200 | 110 |
| Test Ex. 14 | 80Cr20Mo | 20 | 3603 | 1.27 | 15.28 | 18.75 | 0.33 | 200 | 110 |
| Test Ex. 15 | 90Cr10Ru | 20 | 3187 | 1.23 | 15.74 | 17.25 | 0.39 | 200 | 110 |
| Test Ex. 16 | 90Cr10Ta | 20 | 3455 | 1.21 | 15.56 | 17.85 | 0.37 | 200 | 110 |
| Test Ex. 17 | 80Cr20W | 20 | 3592 | 1.26 | 15.31 | 18.64 | 0.34 | 200 | 110 |

TABLE 2

| | Orientation-determining film | | | Magnetostatic characteristics | | | | Thermal | Orientation plane | |
|---|---|---|---|---|---|---|---|---|---|---|
| | Composition (at %) | Thickness (nm) | Angle determination | Coercive force (Oe) | Magnetic anisotropy (-) | PW50 (ns) | S/N (dB) | decay (%/decade) | Undercoat film | Magnetic film |
| Test Ex. 7 | 85Cr15Ti | 20 | Yes | 3471 | 1.23 | 15.49 | 18.05 | 0.36 | 200 | 110 |
| Test Ex. 18 | 85Cr15Ti | 20 | No | 2709 | 1.00 | 16.48 | 16.58 | 0.54 | 110,200 | 101,110 |
| Test Ex. 10 | 85Cr15V | 20 | Yes | 3622 | 1.31 | 15.16 | 19.14 | 0.32 | 200 | 110 |
| Test Ex. 19 | 85Cr15V | 20 | No | 2433 | 1.00 | 15.85 | 16.78 | 0.58 | 110,200 | 101,110 |

TABLE 3

| | Orientation-determining film | | Nitrogen content of | Magnetostatic characteristics | |
|---|---|---|---|---|---|
| | Composition (at %) | Thickness (nm) | sputtering gas (vol %) | Coercive force (Oe) | Magnetic anisotropy (-) |
| Test Ex. 20 | 85Cr15Ti | 20 | 0 | 3471 | 1.23 |
| Test Ex. 21 | 85Cr15Ti | 20 | 10 | 3457 | 1.24 |
| Test Ex. 22 | 85Cr15Ti | 20 | 20 | 3494 | 1.26 |
| Test Ex. 23 | 85Cr15Ti | 20 | 30 | 3506 | 1.25 |
| Test Ex. 24 | 85Cr15Ti | 20 | 60 | 3483 | 1.24 |
| Test Ex. 25 | 80Cr20Nb | 20 | 0 | 3591 | 1.29 |
| Test Ex. 26 | 80Cr20Nb | 20 | 20 | 3754 | 1.33 |
| Test Ex. 27 | 90Cr10Ta | 20 | 0 | 3455 | 1.21 |
| Test Ex. 28 | 90Cr10Ta | 20 | 20 | 3659 | 1.23 |
| Test Ex. 29 | 80Cr20W | 20 | 0 | 3592 | 1.26 |
| Test Ex. 30 | 80Cr20W | 20 | 20 | 3200 | 1.29 |

TABLE 4

| | Orientation-determining film | | Magnetostatic characteristics | | | | |
|---|---|---|---|---|---|---|---|
| | Composition (at %) | Thickness (nm) | Coercive force (Oe) | Magnetic anisotropy (–) | PW50 (ns) | S/N (dB) | Thermal decay (%/decade) |
| Test Ex. 1 | — | — | 2213 | 1.00 | 16.93 | 12.90 | 0.86 |
| Test Ex. 31 | V | 10 | 3420 | 1.16 | 15.70 | 17.36 | 0.39 |
| Test Ex. 32 | V | 20 | 3680 | 1.17 | 15.47 | 18.14 | 0.36 |
| Test Ex. 33 | V | 50 | 3748 | 1.23 | 15.26 | 18.83 | 0.33 |
| Test Ex. 34 | Cr | 20 | 3390 | 1.19 | 15.66 | 17.51 | 0.38 |
| Test Ex. 35 | Cr | 80 | 3332 | 1.20 | 15.68 | 17.43 | 0.38 |
| Test Ex. 36 | Nb | 20 | 2910 | 1.23 | 15.98 | 16.47 | 0.42 |
| Test Ex. 37 | Mo | 20 | 3420 | 1.13 | 15.78 | 17.13 | 0.40 |
| Test Ex. 38 | Ta | 20 | 3796 | 1.30 | 15.03 | 19.57 | 0.31 |
| Test Ex. 39 | W | 20 | 3540 | 1.16 | 15.61 | 17.68 | 0.37 |

Note: formation of no orientation-determining film in Test Example 1.

TABLE 5

| | Orientation-determining film | | Oxygen content of sputtering gas (vol %) | Magnetostatic characteristics | |
|---|---|---|---|---|---|
| | Composition (at %) | Thickness (nm) | | Coercive force (Oe) | Magnetic anisotropy (–) |
| Test Ex. 40 | Cr | 20 | 0 | 3390 | 1.19 |
| Test Ex. 41 | Cr | 20 | 10 | 3220 | 1.21 |
| Test Ex. 42 | Cr | 20 | 30 | 2949 | 1.25 |
| Test Ex. 43 | Nb | 20 | 0 | 2910 | 1.23 |
| Test Ex. 44 | Nb | 20 | 10 | 2813 | 1.25 |
| Test Ex. 45 | Ta | 20 | 0 | 3796 | 1.30 |
| Test Ex. 46 | Ta | 20 | 10 | 3551 | 1.31 |
| Test Ex. 47 | W | 20 | 0 | 3540 | 1.16 |
| Test Ex. 48 | W | 20 | 10 | 3531 | 1.17 |

TABLE 6

| | Orientation-determining film | | | | Magnetostatic characteristics | |
|---|---|---|---|---|---|---|
| | Composition (at %) | Thickness (nm) | Exposure gas | Exposure time (second) | Coercive force (Oe) | Magnetic anisotropy (–) |
| Test Ex. 49 | Cr | 20 | — | — | 3390 | 1.19 |
| Test Ex. 50 | Cr | 20 | 10 vol % O$_2$/Ar | 5 | 3179 | 1.22 |
| Test Ex. 51 | Cr | 20 | 10 vol % N$_2$/Ar | 5 | 3345 | 1.24 |
| Test Ex. 52 | Nb | 20 | — | — | 2910 | 1.23 |
| Test Ex. 53 | Nb | 20 | 10 vol % N$_2$/Ar | 5 | 2909 | 1.28 |
| Test Ex. 54 | Nb | 20 | 10 vol % N$_2$/Ar | 10 | 3011 | 1.28 |
| Test Ex. 55 | Ta | 20 | — | — | 3796 | 1.30 |
| Test Ex. 56 | Ta | 20 | 10 vol % N$_2$/Ar | 5 | 3654 | 1.32 |
| Test Ex. 57 | W | 20 | — | — | 3540 | 1.16 |
| Test Ex. 58 | W | 20 | 10 vol % O$_2$/Ar | 5 | 3544 | 1.19 |
| Test Ex. 59 | 65Co35Ta | 20 | — | — | 3399 | 1.23 |
| Test Ex. 60 | 65Co35Ta | 20 | 10 vol % O$_2$/Ar | 5 | 3457 | 1.29 |
| Test Ex. 61 | 65Co35Ta | 20 | 10 vol % N$_2$/Ar | 5 | 3511 | 1.30 |
| Test Ex. 62 | 70Co30Nb | 20 | — | — | 3264 | 1.18 |
| Test Ex. 63 | 70Co30Nb | 20 | 10 vol % O$_2$/Ar | 5 | 3376 | 1.25 |
| Test Ex. 64 | 70Co30Nb | 20 | 10 vol % N$_2$/Ar | 5 | 3349 | 1.24 |
| Test Ex. 65 | 50Ni50Nb | 20 | — | — | 3479 | 1.22 |
| Test Ex. 66 | 50Ni50Nb | 20 | 10 vol % O$_2$/Ar | 5 | 3568 | 1.31 |
| Test Ex. 67 | 50Ni50Nb | 20 | 10 vol % N$_2$/Ar | 5 | 3491 | 1.29 |
| Test Ex. 68 | 50Ni50Ta | 20 | — | — | 3280 | 1.18 |
| Test Ex. 69 | 50Ni50Ta | 20 | 10 vol % N$_2$/Ar | 5 | 3363 | 1.27 |

Note: 10 vol % O$_2$/Ar: oxygen content is 10 vol %, and Ar is balance.

TABLE 7

| | Orientation-enhancing film | | | Orientation-determining film | | Magnetostatic characteristics | |
|---|---|---|---|---|---|---|---|
| | Composition (at %) | Structure | Thickness (nm) | Composition (at %) | Thickness (nm) | Coercive force (Oe) | Magnetic anisotropy (−) |
| Test Ex. 12 | — | — | — | 70Cr30Nb | 20 | 3631 | 1.30 |
| Test Ex. 70 | Cr | A2 | 5 | 70Cr30Nb | 20 | 3924 | 1.32 |
| Test Ex. 71 | Cr | A2 | 10 | 70Cr30Nb | 20 | 3547 | 1.33 |
| Test Ex. 72 | Cr | A2 | 30 | 70Cr30Nb | 20 | 3449 | 1.34 |
| Test Ex. 73 | Mo | A2 | 10 | 70Cr30Nb | 20 | 3645 | 1.31 |
| Test Ex. 74 | V | A2 | 10 | 70Cr30Nb | 20 | 3619 | 1.33 |
| Test Ex. 75 | W | A2 | 10 | 70Cr30Nb | 20 | 3692 | 1.35 |
| Test Ex. 7 | — | — | — | 85Cr15Ti | 20 | 3471 | 1.23 |
| Test Ex. 76 | Cr | A2 | 20 | 85Cr15Ti | 20 | 3588 | 1.24 |
| Test Ex. 77 | 80Cr20Nb | (A2) | 10 | 85Cr15Ti | 20 | 3462 | 1.25 |
| Test Ex. 78 | V | A2 | 10 | 85Cr15Ti | 20 | 3732 | 1.25 |
| Test Ex. 79 | 50Ni50Al | B2 | 10 | 85Cr15Ti | 20 | 3555 | 1.28 |
| Test Ex. 80 | 50Co50Al | B2 | 15 | 85Cr15Ti | 20 | 3752 | 1.27 |
| Test Ex. 81 | 50Fe50Al | B2 | 10 | 85Cr15Ti | 20 | 3585 | 1.29 |
| Test Ex. 82 | 57Cu43Zr | Amorphous | 20 | 85Cr15Ti | 20 | 3665 | 1.27 |
| Test Ex. 83 | 50Ti50Cu | Amorphous | 30 | 85Cr15Ti | 20 | 3517 | 1.28 |
| Test Ex. 84 | 50Nb50Nl | Amorphous | 15 | 85Cr15Ti | 20 | 3672 | 1.27 |
| Test Ex. 85 | 80Pd20Si | Amorphous | 20 | 85Cr15Ti | 20 | 3464 | 1.27 |
| Test Ex. 86 | 50Co30Cr20B | Amorphous | 25 | 85Cr15Ti | 20 | 3804 | 1.30 |
| Test Ex. 87 | 80Co20Zr | Amorphous | 30 | 85Cr15Ti | 20 | 3632 | 1.34 |
| Test Ex. 88 | 67Co33Zr | Amorphous | 30 | 85Cr15Ti | 20 | 3632 | 1.35 |
| Test Ex. 12 | — | — | — | 70Cr30Nb | 20 | 3631 | 1.30 |
| Test Ex. 89 | 60Co30Cr10Zr | Amorphous | 40 | 70Cr30Nb | 20 | 3616 | 1.39 |
| Test Ex. 90 | 56Co26Cr18C | Amorphous | 25 | 70Cr30Nb | 20 | 3852 | 1.37 |

TABLE 8

| | Orientation-determining film | | | Nitrogen content of Sputtering gas (vol %) | Non-magnetic undercoat film | | Magnetostatic characteristics | |
|---|---|---|---|---|---|---|---|---|
| | Composition (at %) | Thickness (nm) | Crystal structure | | Composition (at %) | Thickness (nm) | Coercive force (Oe) | Magnetic anisotropy (−) |
| Test Ex. 91 | — | — | — | — | 80Cr20V | 20 | 1978 | 1.00 |
| Test Ex. 92 | 80Cr15Nb | 20 | Im3m | — | 80Cr20V | 20 | 3499 | 1.25 |
| Test Ex. 93 | 70Cr30Nb | 20 | Fd3m | — | 80Cr20V | 20 | 3521 | 1.32 |
| Test Ex. 94 | 70Cr30Nb | 20 | Fd3m | 20 | 80Cr20V | 20 | 3651 | 1.36 |
| Test Ex. 95 | 90Cr10Ta | 20 | Im3m | — | 80Cr20V | 20 | 3345 | 1.23 |
| Test Ex. 96 | 65Cr35Ta | 20 | Fd3m | — | 80Cr20V | 20 | 3566 | 1.34 |
| Test Ex. 97 | 65Cr35Ta | 20 | Fd3m | 10 | 80Cr20V | 20 | 3679 | 1.42 |
| Test Ex. 98 | 64Cr36Ti | 20 | Fd3m | — | 80Cr20V | 20 | 3589 | 1.32 |
| Test Ex. 99 | 72Co28Ta | 20 | P6$_2$/mmc | — | 80Cr20V | 20 | 2538 | 1.00 |
| Test Ex. 100 | 65Co35Ta | 20 | Fd3m | — | 80Cr20V | 20 | 3461 | 1.20 |
| Test Ex. 101 | 50Co50Ta | 20 | P4$_2$/mnm | — | 80Cr20V | 20 | 2451 | 1.00 |
| Test Ex. 102 | 50Co50Ta | 20 | Fd3m | 20 | 80Cr20V | 20 | 3431 | 1.22 |
| Test Ex. 103 | 75Co25Nb | 20 | P6$_2$/mmc | — | 80Cr20V | 20 | 2466 | 1.00 |
| Test Ex. 104 | 70Co30Nb | 20 | Fd3m | — | 80Cr20V | 20 | 3388 | 1.19 |
| Test Ex. 105 | 70Ni30Ta | 20 | I4/mmm | — | 80Cr20V | 20 | 3193 | 1.11 |
| Test Ex. 106 | 50Ni50Ta | 20 | R3m | — | 80Cr20V | 20 | 3498 | 1.25 |
| Test Ex. 107 | 35Ni65Ta | 20 | I4/mmm | — | 80Cr20V | 20 | 3201 | 1.15 |
| Test Ex. 108 | 35Ni65Ta | 20 | Fd3m | 10 | 80Cr20V | 20 | 3566 | 1.32 |
| Test Ex. 109 | 75Ni25Nb | 20 | Pmmm | — | 80Cr20V | 20 | 2763 | 1.00 |
| Test Ex. 110 | 50Ni50Nb | 20 | R3m | — | 80Cr20V | 20 | 3519 | 1.24 |
| Test Ex. 111 | 50Ni50Nb | 20 | Fd3m | 10 | 80Cr20V | 20 | 3578 | 1.33 |
| Test Ex. 112 | 66W34Hf | 20 | Fd3m | — | 80Cr20V | 20 | 3216 | 1.15 |
| Test Ex. 113 | 67Al33Y | 20 | Fd3m | — | 80Cr20V | 20 | 3143 | 1.14 |
| Test Ex. 114 | 50Fe50Nb | 20 | R3m | — | 80Cr20V | 20 | 3151 | 1.10 |
| Test Ex. 115 | 50Fe50Nb | 20 | Fd3m | 10 | 80Cr20V | 20 | 3166 | 1.16 |

Note: Im3m, Fd3m, P6$_2$/mmc, P4$_2$/mnm, I4/mmm, R3m, and Pmmm: according to space group notation.

TABLE 9

| | Orientation-determining film | | | | | Angle determination | Non-magnetic undercoat film | | Magnetostatic characteristics | |
|---|---|---|---|---|---|---|---|---|---|---|
| | Composition | Crystal structure | Thickness (nm) | Exposure gas | Exposure time (second) | | Composition (at %) | Thickness (nm) | Coercive force (Oe) | Magnetic anisotropy (-) |
| Test Ex. 116 | — | — | — | — | — | — | 85Cr15W | 15 | 2365 | 1.00 |
| Test Ex. 117 | 75Ni25P | Am | 20 | 10 vol % O$_2$/Ar | 5 | No | 85Cr15W | 15 | 3312 | 1.00 |
| Test Ex. 118 | 75Ni25P | Am | 20 | 10 vol % O$_2$/Ar | 5 | Yes | 85Cr15W | 15 | 3427 | 1.15 |
| Test Ex. 119 | 75Ni25P | Am | 20 | — | — | Yes | 85Cr15W | 15 | 2759 | 1.16 |
| Test Ex. 120 | 75Ni25P | Am | 20 | 10 vol % O$_2$/Ar | 10 | Yes | 85Cr15W | 15 | 3499 | 1.16 |
| Test Ex. 121 | 75Ni25P | Am | 45 | 10 vol % O$_2$/Ar | 5 | Yes | 85Cr15W | 15 | 3178 | 1.15 |
| Test Ex. 122 | 67Ni33P | Am | 20 | 10 vol % O$_2$/Ar | 5 | No | 85Cr15W | 15 | 3194 | 1.00 |
| Test Ex. 123 | 67Ni33P | Am | 20 | 10 vol % O$_2$/Ar | 5 | Yes | 85Cr15W | 15 | 3381 | 1.13 |
| Test Ex. 124 | 67Ni33P | Am | 20 | 30 vol % O$_2$/Ar | 5 | Yes | 85Cr15W | 15 | 3411 | 1.14 |
| Test Ex. 125 | 67Ni33P | Am | 20 | 50 vol % O$_2$/Ar | 5 | Yes | 85Cr15W | 15 | 3405 | 1.13 |
| Test Ex. 126 | 80Ni20P | Am | 20 | 10 vol % O$_2$/Ar | 5 | Yes | 85Cr15W | 15 | 3483 | 1.16 |
| Test Ex. 127 | 80Ni20P | Am | 20 | 10 vol % N$_2$/Ar | 5 | Yes | 85Cr15W | 15 | 3404 | 1.14 |

Am: Amorphous

As is apparent from Table 1, when the orientation-determining film 2 is provided, the non-magnetic undercoat film 3 and the magnetic film 4 have a bcc structure and an hcp structure, respectively, and the orientation planes of the films 3 and 4 are a (200) plane and a (110) plane, respectively.

The results show that the magnetic anisotropy and magnetic characteristics of the medium can be enhanced.

Comparison among Test Examples 7 through 9 and 11 through 13 shows that, when the orientation-determining film 2 is formed from CrX and the content of X in the CrX is less than 50 at %, the film 2 exerts the effect of enhancing magnetic characteristics.

As is apparent from Table 2, when the incident angle of the trajectory of film formation particles is restricted so as to form the orientation-determining film 2 having a crystal structure in which columnar fine crystal grains 2a are inclined in a radial direction of the medium, the film 2 exerts an excellent effect of enhancing magnetic characteristics.

As is apparent from Table 3, when the surface of the orientation-determining film 2 is subjected to nitridation by use of a nitrogen-containing sputtering gas, the degree of enhancement of magnetic anisotropy is equal to or greater than that attained when the film 2 is not subjected to nitridation.

As is apparent from Table 4, even when the orientation-determining film 2 is formed from a single metallic element shown in Table 4, excellent magnetic anisotropy is obtained.

As is apparent from Table 5, when the surface of the orientation-determining film 2 is subjected to oxddation by use of an oxygen-containing sputtering gas, the degree of enhancement of magnetic anisotropy is equal to or greater than that attained when the film 2 is not subjected to oxidation.

As is apparent from Table 6, when the surface of the orientation-determining film 2 is subjected to oxidation or nitridation after the film 2 is formed, the degree of enhancement of magnetic anisotropy is equal to or greater than that attained when the film 2 is subjected to neither oxidation nor nitridation.

The results show that, when the orientation-determining film 2 is formed from CoTa, CoNb, NiNb, or NiTa, excellent magnetostatic characteristics are obtained.

As is apparent from Table 7, when the orientation-enhancing film 12 is formed, the degree of enhancement of magnetic anisotropy is equal to or greater than that attained when the film 12 is not formed.

The results show that, when the orientation-enhancing film 12 is formed from a material having a B2 structure or an amorphous structure, magnetic anisotropy is further enhanced.

As is apparent from Table 8, when the orientation-determining film 2 is formed from a CrX-based alloy having an Fd3m structure, the degree of enhancement of magnetic anisotropy is equal to or greater than that attained when the film 2 is formed from a material having another crystal structure.

The results show that, when the orientation-determining film 2 is formed from CoNb, NiTa, or NiNb, excellent magnetostatic characteristics are obtained.

As is apparent from the results of Test Examples 99 through 115, even when the orientation-determining film 2 is formed from a non-CrX-based alloy, rather than a CrX-based alloy, a non-magnetic metallic material having an Fd3m structure, excellent magnetic anisotropy is obtained.

As is apparent from Table 9, even when the orientation-determining film 2 is formed from an NiP alloy, excellent magnetic anisotropy is obtained.

Comparison among Test Examples 118, 119, 126, and 127 shows that, when the orientation-determining film 2 is subjected to oxidation or nitridation, excellent magnetic characteristics are obtained.

According to the magnetic recording medium of the present invention, an orientation-determining film, which determines the crystal orientation of a film provided directly thereon, is formed between a non-metallic substrate and a non-magnetic undercoat film, and the orientation-determining film has a crystal structure in which columnar fine crystal grains are inclined in a radial direction of the substrate. Therefore, the crystal orientation of the non-magnetic undercoat film and a magnetic film can be improved, and the magnetic anisotropy of the magnetic film can be enhanced.

Therefore, magnetic characteristics of the magnetic recording medium, such as thermal stability, error rate, and S/N ratio, can be enhanced, and thus recording density can be increased.

Furthermore, the magnetic anisotropy of the magnetic recording medium can be enhanced without carrying out texturing during production of the medium, and thus the production process is simplified and production costs can be reduced.

When the magnetic recording medium includes an orientation-determining film formed from an NiP alloy, and the ratio of a coercive force in a circumferential direction of the medium (Hcc) to a coercive force in a radial direction of the medium (Hcr); i.e., Hcc/Hcr, is more than 1, the crystal orientation of a non-magnetic undercoat film and a magnetic film is improved, and the magnetic anisotropy of the magnetic film can be enhanced.

Consequently, magnetic characteristics of the magnetic recording medium can be enhanced, and thus recording density can be increased. Furthermore, the magnetic anisotropy of the magnetic recording medium can be enhanced without carrying out texturing during production of the medium, and thus the production process is simplified and production costs can be reduced.

According to the process for producing the magnetic recording medium of the present invention, an orientation-determining film is formed by releasing from a release source film formation particles containing a material constituting the film and then depositing the particles onto a deposition surface, and, during formation of the film, the direction of the trajectory of the film formation particles is determined such that a projection line of the trajectory of the particles formed on the deposition surface lies along a radial direction of a non-metallic substrate, and the incident angle of the trajectory of the particles is 10–75° with respect to the non-metallic substrate. Therefore, the crystal orientation of a non-magnetic undercoat film and a magnetic film is improved, and the magnetic anisotropy of the magnetic film can be enhanced.

Therefore, magnetic characteristics of the magnetic recording medium, such as thermal stability, error rate, and S/N ratio, can be enhanced, and thus recording density can be increased.

Furthermore, a texturing step is not necessary during production of the medium, and thus the production process is simplified and production costs can be reduced.

The production apparatus of the present invention includes a release source for releasing film formation particles and means for determining the direction of the trajectory of the particles released from the release source, and the direction-determining means can determine the direction of the trajectory of the particles such that a projection line of the trajectory of the particles formed on a deposition surface lies along a radial direction of a non-metallic substrate, and the incident angle of the trajectory of the particles is 10–75° with respect to the non-metallic substrate. Therefore, the incident direction of the trajectory of the particles with respect to the non-metallic substrate can be accurately determined.

This follows that recording density can be increased, since the magnetic anisotropy of the medium can be enhanced, and S/N ratio and error rate can be improved. In addition, problems including loss of recorded data, which is attributed to thermal decay, can be eliminated.

According to the magnetic recording and reproducing apparatus of the present invention, recording density can be increased, since the magnetic anisotropy of the magnetic recording medium can be enhanced, and thus S/N ratio and error rate can be improved. In addition, problems including loss of recorded data, which is attributed to thermal decay, can be eliminated.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising (1) a non-metallic substrate, (2) an orientation-determining film which determines the crystal orientation of an undercoat film provided directly thereon to cause the texture of the undercoat film to be (200), (3) a non-magnetic undercoat film, (4) a cobalt alloy hexagonal closed packed (hcp) (110) textured magnetic film, and (5) a protective film in order; wherein the orientation-determining film has a crystal structure in which columnar crystal grains are inclined in a radial direction of the substrate; and a ratio of a coercive force in a circumferential direction of the medium (Hcc) to a coercive force in a radial direction of the medium (Hcr) is more than 1.

2. A magnetic recording medium according to claim 1, wherein the non-magnetic undercoat film has a bcc structure, and an orientation plane of the film is a (200) plane.

3. A magnetic recording medium according to claim 2, wherein the orientation-determining film comprises one or more elements selected from the group consisting of Cr, V, Nb, Mo, W, and Ta.

4. A magnetic recording medium according to claim 2, wherein the orientation-determining film comprises an alloy predominantly containing Cr.

5. A magnetic recording medium according to claim 2, wherein the orientation-determining film predominantly comprises CoTa where the Ta content is 30–75 at % or CoNb where the Nb content is 30–75 at %, and has an Fd3m structure or an amorphous structure.

6. A magnetic recording medium according to claim 2, wherein the orientation-determining film predominantly comprises CrTa where the Ta content is 15–75 at % or CrNb where the Nb content is 15–75 at %.

7. A magnetic recording medium according to claim 2, wherein the orientation-determining film predominantly comprises NiTa where the Ta content is 30–75 at % or NiNb where the Nb content is 30–75 at %, and has an Fd3m structure or an amorphous structure.

8. A magnetic recording medium according claim 2, wherein the orientation-determining film comprises a non-magnetic metal having an Fd3m structure.

9. A magnetic recording medium according to claim 2, wherein the orientation-determining film comprises a non-magnetic metal having a C15 structure.

10. A magnetic recording medium according to claim 2, wherein the orientation-determining film comprises nitrogen or oxygen in an amount of 1 at % or more.

11. A magnetic recording medium according to claim 2, wherein an orientation-enhancing film is formed between the non-metallic substrate and the orientation-determining film.

12. A magnetic recording medium according to claim 11, wherein the orientation-enhancing film comprises a material having a B2 structure or an amorphous structure.

13. A magnetic recording medium according to claim 11, wherein the orientation-enhancing film predominantly comprises any alloy selected from the group consisting of NiAl, FeAl, CoAl, CoZr, CoCrZr, and CoCrC.

14. A magnetic recording medium comprising (1) a non-metallic substrate, (2) an orientation-determining film which determines the crystal orientation of an undercoat film provided directly thereon to cause the texture of the undercoat film to be (200), (3) a non-magnetic undercoat film, (4) a magnetic film, and (5) a protective film in order; wherein the orientation-determining film comprises an amorphous NiP alloy and has a crystal structure in which columnar crystal grains are inclined in a radial direction of the substrate; and a ratio of a coercive force in a circumferential direction of the medium (Hcc) to a coercive force in a radial direction of the medium (Hcr) is more than 1.

15. A process for producing a magnetic recording medium, wherein the magnetic recording medium is a magnetic recording medium according to claim 2, which process comprises forming the orientation-determining film by releasing from a release source film formation particles containing a material constituting the film, and then depositing the particles onto a deposition surface, wherein a direction of a trajectory of the film formation particles is determined such that a projection line of the trajectory of the particles formed on the deposition surface lies along a radial direction of the non-metallic substrate, and so that an incident angle ($\alpha$) of the trajectory of the particles is 10–75° with respect to the non-metallic substrate.

16. A process for producing a magnetic recording medium according to claim 15, further comprising subjecting the orientation-determining film to oxidation or nitridation.

17. A process for producing a magnetic recording medium according to claim 15, further comprising sputtering to form the orientation-determining film using a sputtering target serving as the release source of film formation particles.

18. A process for producing a magnetic recording medium according to claim 16, further comprising subjecting the orientation-determining film to oxidation or nitridation using a sputtering gas containing oxygen or nitrogen after forming the orientation-determining film.

19. A process for producing a magnetic recording medium according to claim 16, wherein the oxidation or nitridation is carried out by bringing the orientation-determining film into contact with an oxygen-containing gas or a nitrogen-containing gas.

20. An apparatus for producing a magnetic recording medium, wherein the magnetic recording medium is a magnetic recording medium according to claim 2, which apparatus comprises a release source for releasing film formation particles containing a material constituting the orientation-determining film, wherein the film is formed through deposition of the particles onto a deposition surface; and means for determining a direction of a trajectory of the film formation particles released from the release source, wherein the direction-determining means can determine the direction of the trajectory of the particles such that a projection line of the trajectory of the particles formed on the deposition surface lies along a radial direction of the non-metallic substrate, and so that an incident angle of the trajectory of the particles is 10–75° with respect to the non-metallic substrate.

21. A magnetic recording and reproducing apparatus comprising a magnetic recording medium as recited in claim 2, and a magnetic head for recording data onto the medium and reproducing the data therefrom.

* * * * *